(12) United States Patent
Sasaki

(10) Patent No.: US 6,404,602 B2
(45) Date of Patent: Jun. 11, 2002

(54) COMBINATION TYPE THIN FILM MAGNETIC HEAD HAVING A STEPPED MAGNETIC LAYER

(75) Inventor: Yoshitaka Sasaki, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/794,130

(22) Filed: Feb. 28, 2001

Related U.S. Application Data

(62) Division of application No. 09/277,845, filed on Mar. 29, 1999, now Pat. No. 6,266,868.

(30) Foreign Application Priority Data

Mar. 31, 1998 (JP) .............................................. 10-86707

(51) Int. Cl.[7] ................................................. G11B 5/39
(52) U.S. Cl. ..................................................... 360/317
(58) Field of Search ................................ 360/317, 318, 360/123, 126

(56) References Cited

U.S. PATENT DOCUMENTS

| 6,130,809 A | * | 10/2000 | Santini ........................ 360/317 |
| 6,154,346 A | * | 11/2000 | Sasaki ........................ 360/317 |
| 6,154,347 A | * | 11/2000 | Sasaki ........................ 360/317 |
| 6,156,375 A | * | 12/2000 | Hu et al. ..................... 427/116 |
| 6,259,585 B1 | * | 7/2001 | Sasaki et al. ................ 360/317 |

FOREIGN PATENT DOCUMENTS

JP  A-7-192222  7/1995

* cited by examiner

Primary Examiner—Jefferson Evans
(74) Attorney, Agent, or Firm—Oliff & Berridge, PLC

(57) ABSTRACT

In a method of mass-producing efficiently and promptly a combination type thin film magnetic head having accurately defined short throat height, apex angle, and MR height or the like and capable of making the saturation and leakage of magnetic flux little, even if a magnetic pole portion is miniaturized, a recessed portion is formed in a surface of a substrate, while a first magnetic layer constituting a lower shield for GMR element is used as a mask, a second magnetic layer is formed along an inner wall of the recessed portion, a thin film coil is formed thereon in an isolated state, and a surface is flattened to constitute a common unit for manufacturing combination type thin film magnetic heads. A number of common units are manufactured and stocked without any relationship to users' specifications. Afterwards, according to user's specification, the third magnetic film connected with the second magnetic film and constituting a bottom pole is formed so as to have a thick portion adjacent to the air bearing surface and a thick portion adjacent to the second magnetic layer, after a step formed between these portions is buried with an insulating spacer layer and a surface is flattened, a flat fourth magnetic layer constituting a write gap layer and a top pole is formed. Finally, the air bearing surface is polished, while the step between the thick and thin portions of the third magnetic film as a reference position of throat height zero.

11 Claims, 12 Drawing Sheets

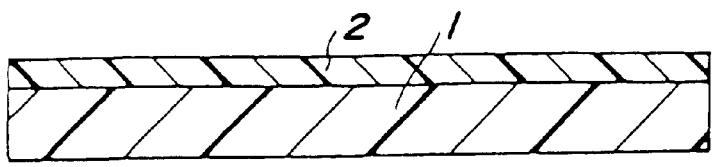
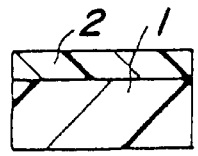
FIG.1A PRIOR ART      FIG.1B
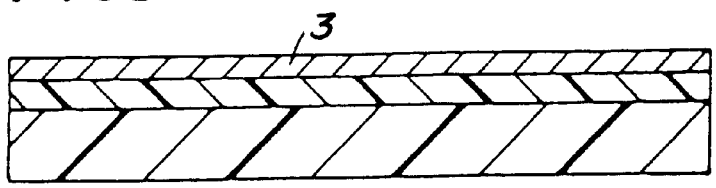
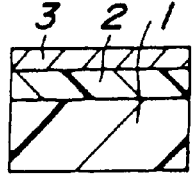
FIG.2A PRIOR ART      FIG.2B
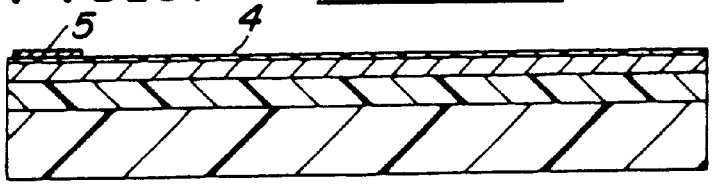
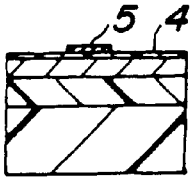
FIG.3A PRIOR ART      FIG.3B
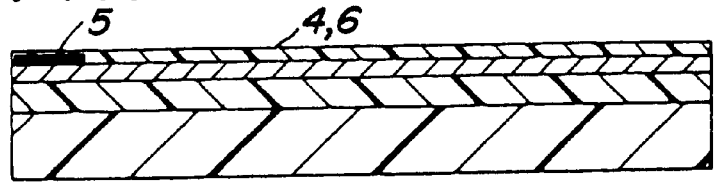
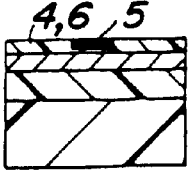
FIG.4A PRIOR ART      FIG.4B
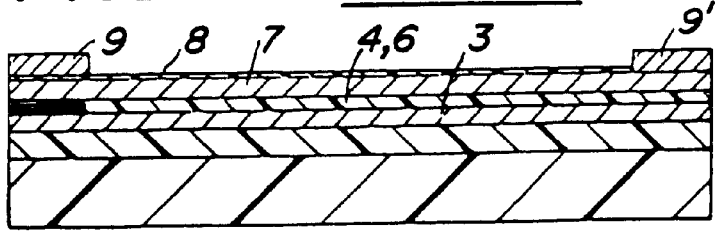
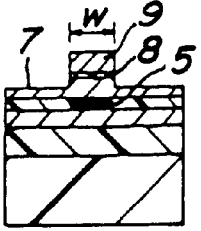
FIG.5A PRIOR ART      FIG.5B
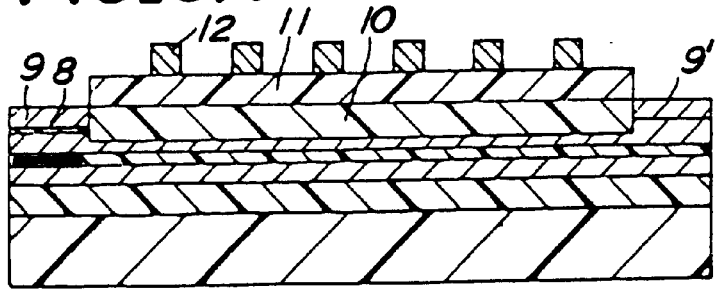
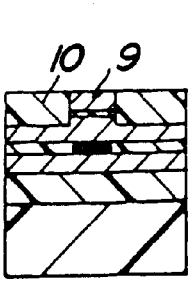
FIG.6A PRIOR ART      FIG.6B

FIG._7A   FIG._7B
_PRIOR ART_
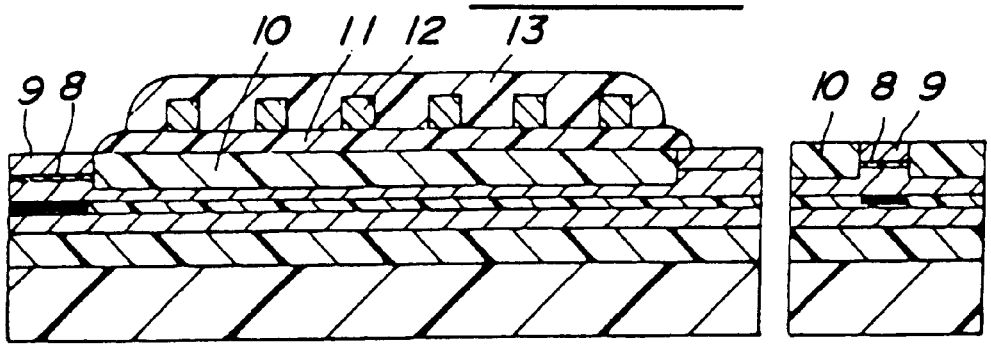
FIG._8A   FIG._8B
_PRIOR ART_
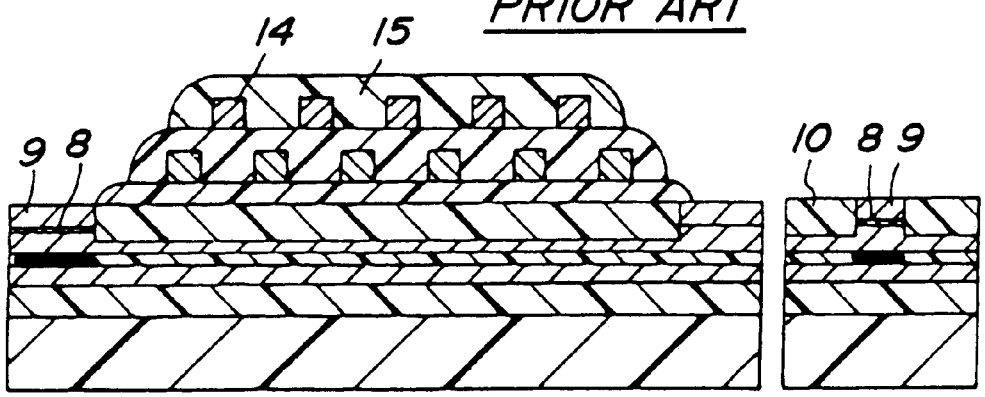
FIG._9A   FIG._9B
_PRIOR ART_
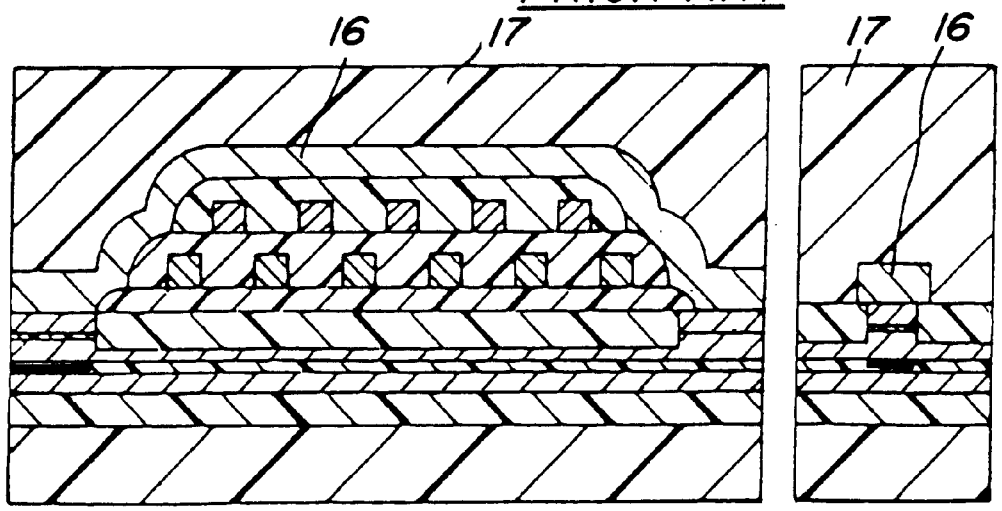

FIG_10
PRIOR ART
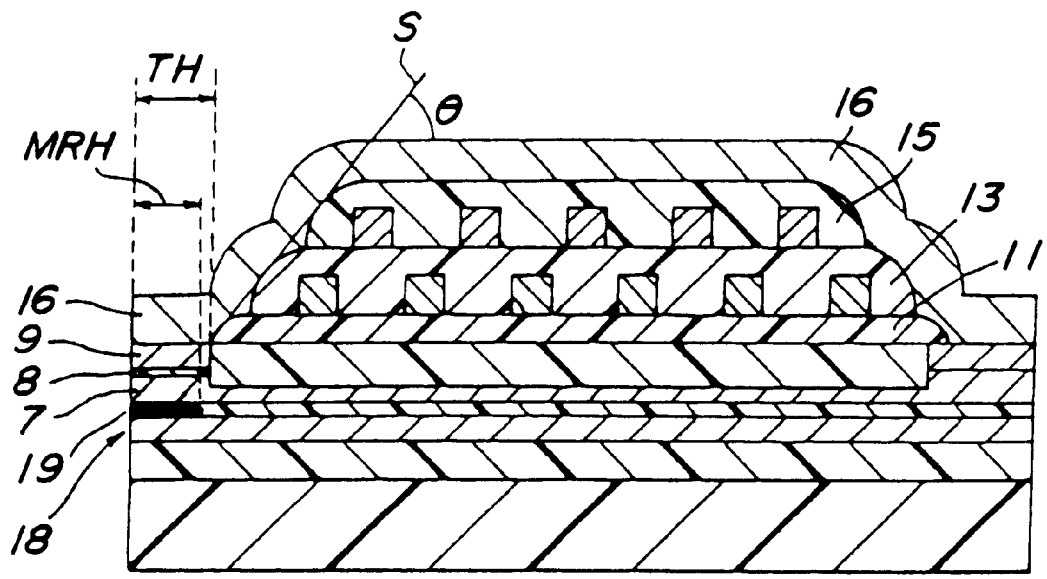
FIG_11
PRIOR ART
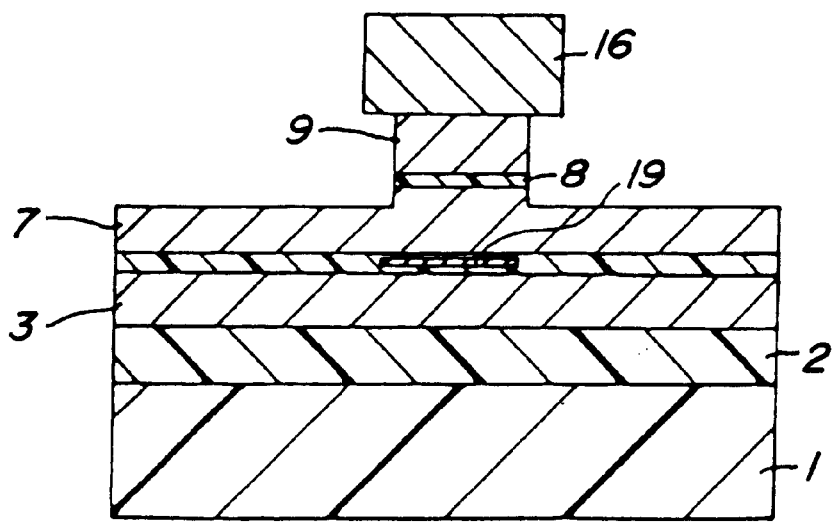

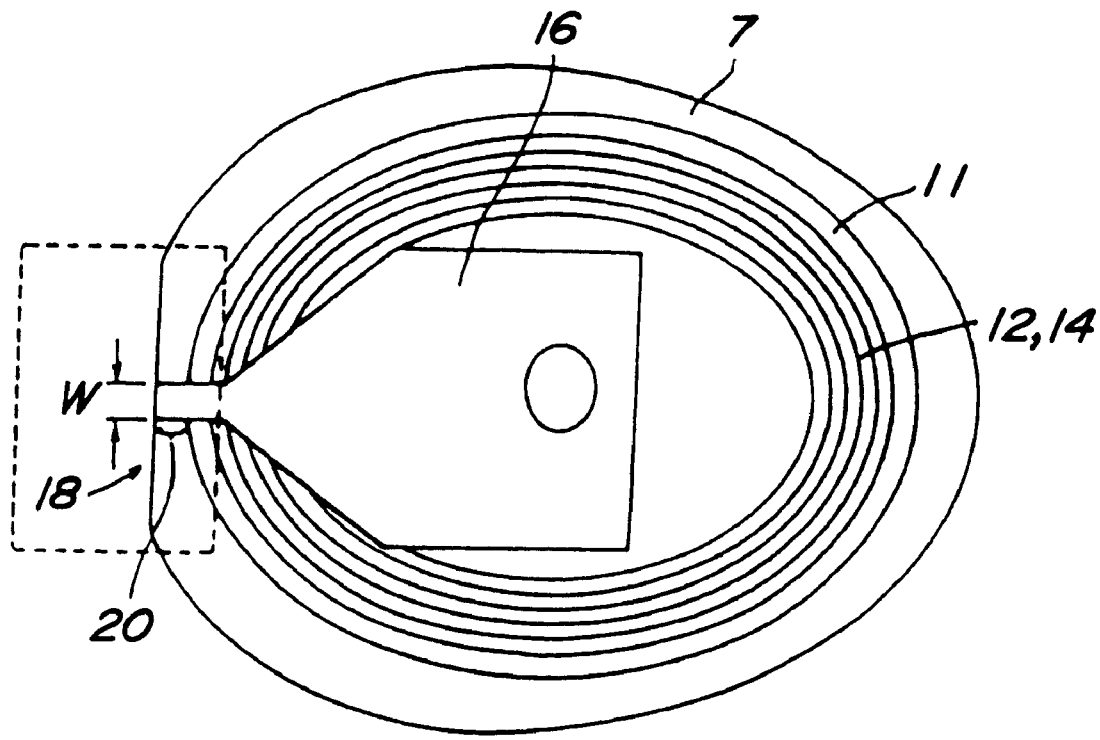
FIG_12
PRIOR ART

FIG._13A    FIG._13B
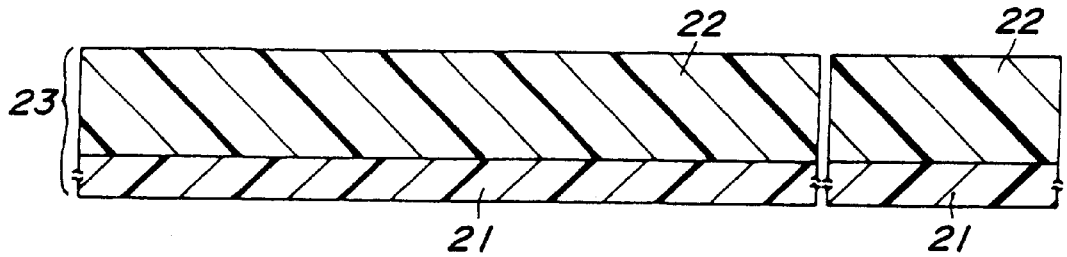
FIG._14A    FIG._14B
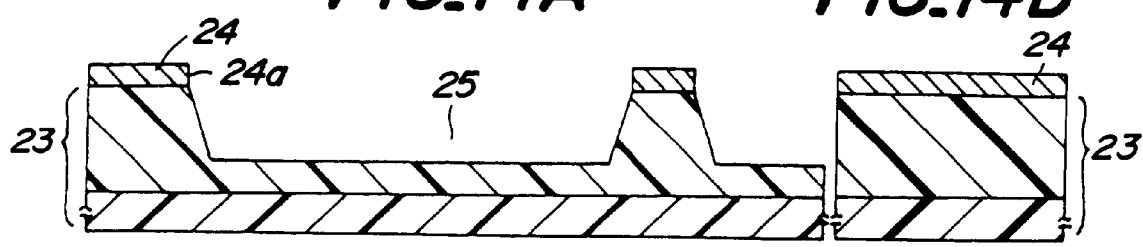
FIG._15A    FIG._15B
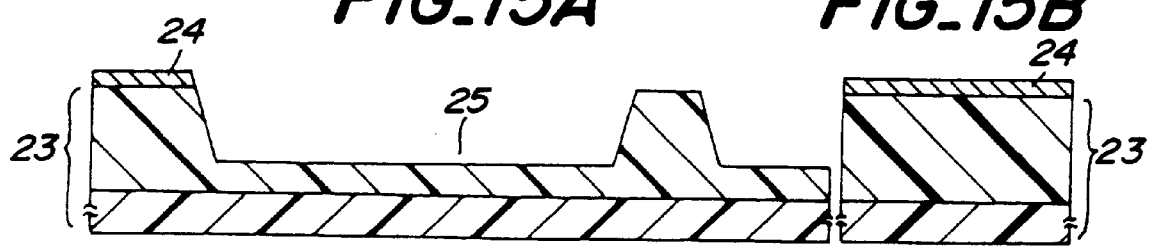
FIG._16A    FIG._16B
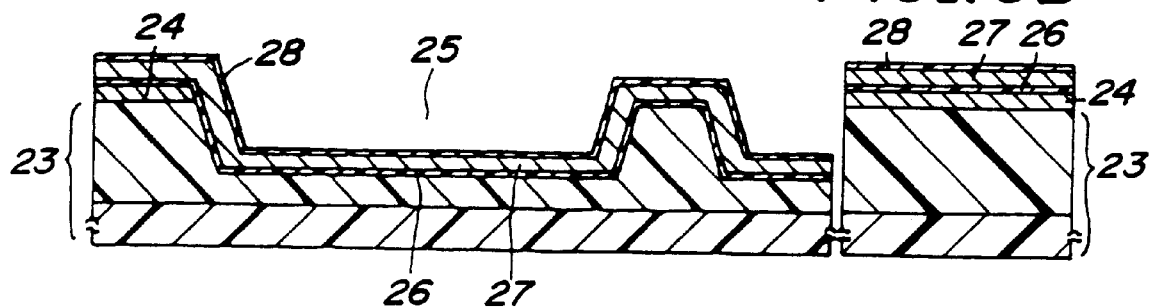

FIG._19A  FIG._19B
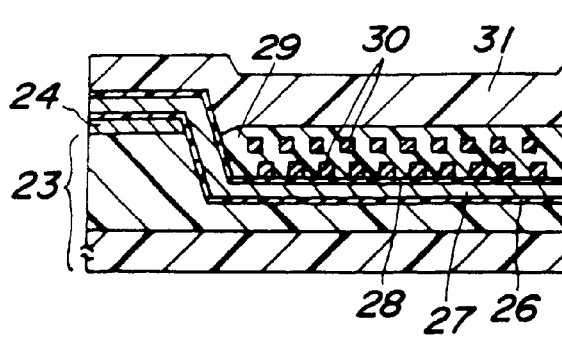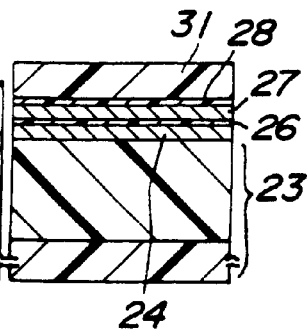
FIG._20A  FIG._20B
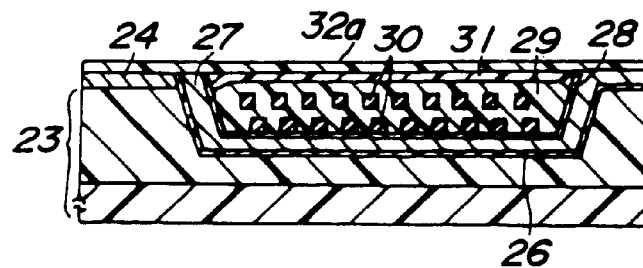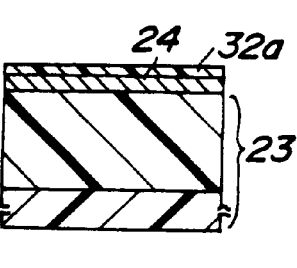
FIG._21A  FIG._21B
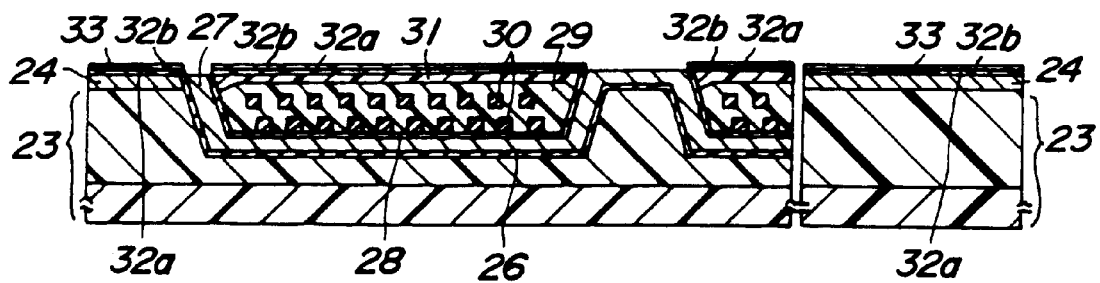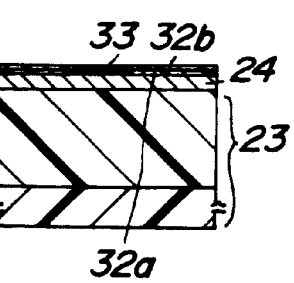
FIG._22A  FIG._22B
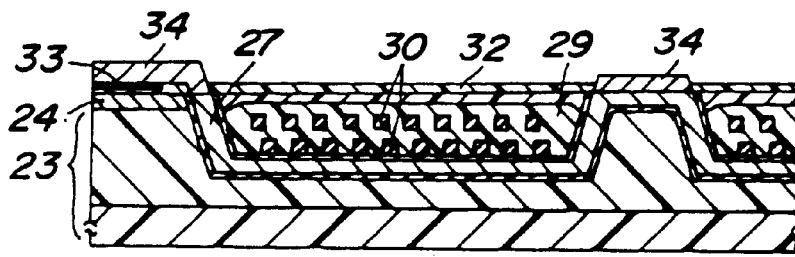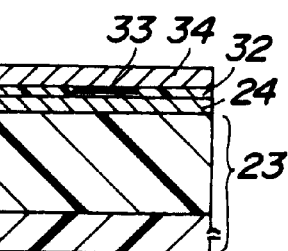

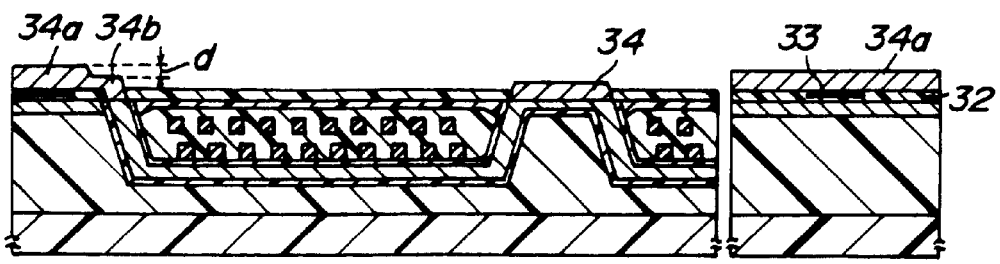
FIG_23A  FIG_23B
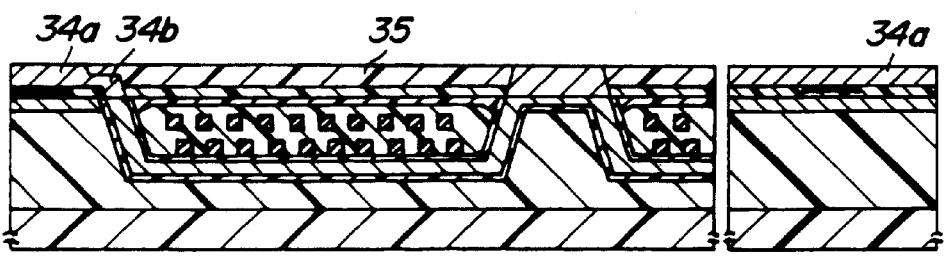
FIG_24A  FIG_24B
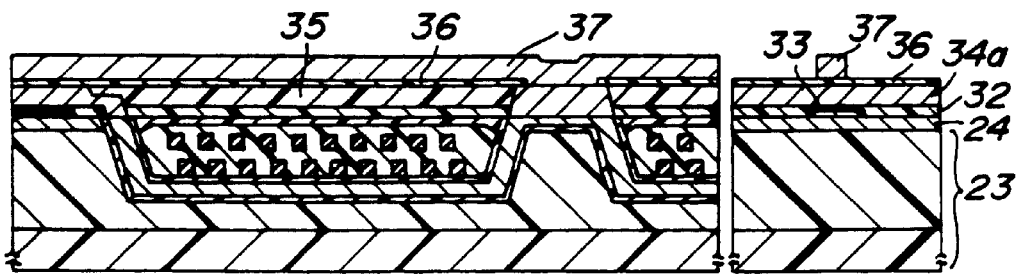
FIG_25A  FIG_25B
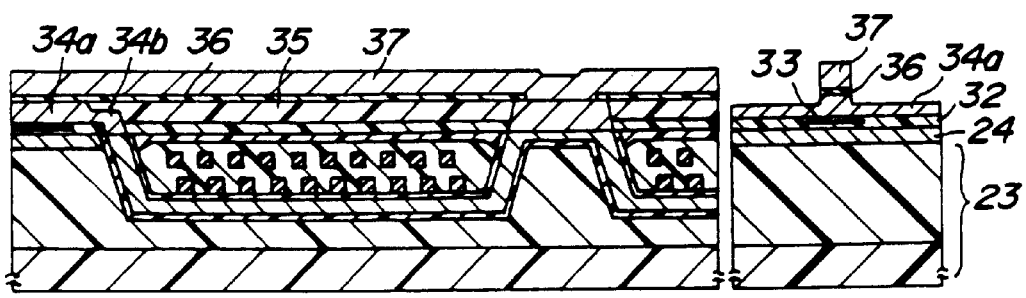
FIG_26A  FIG_26B

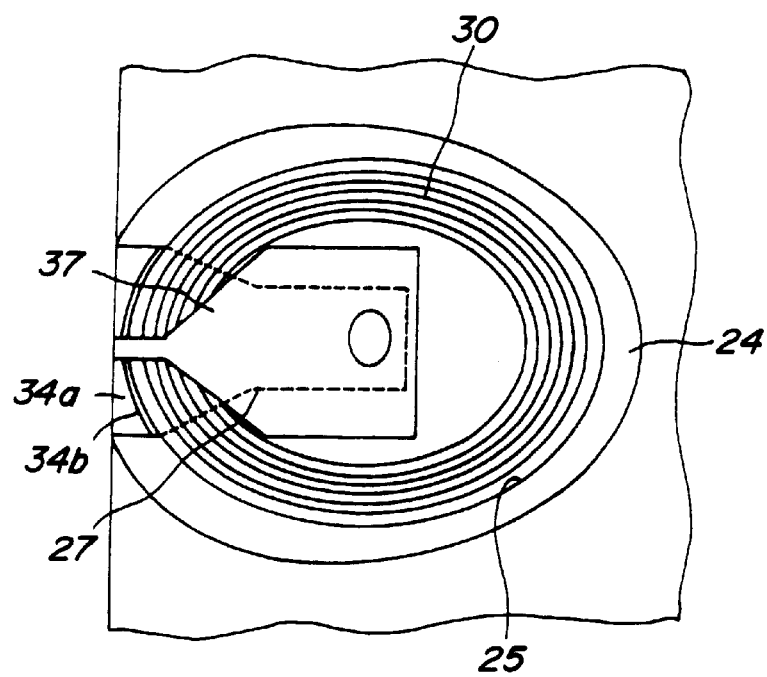
FIG._27
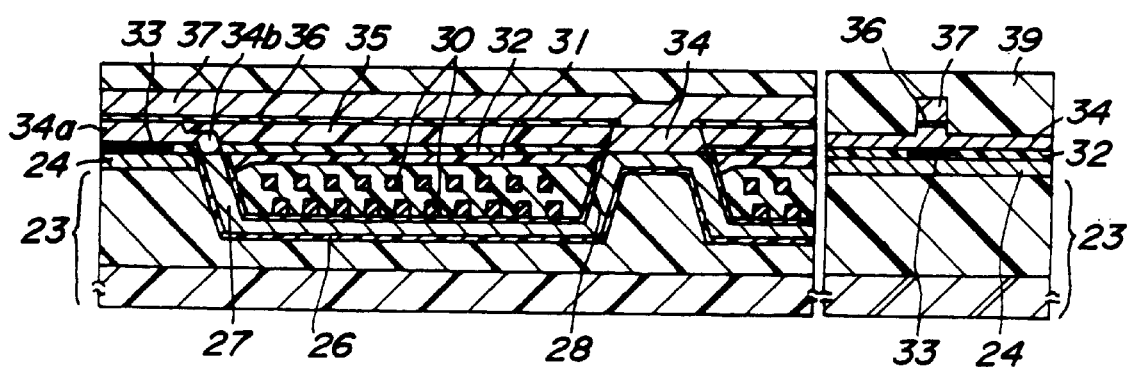
FIG._28A   FIG._28B

FIG_31A    FIG_31B
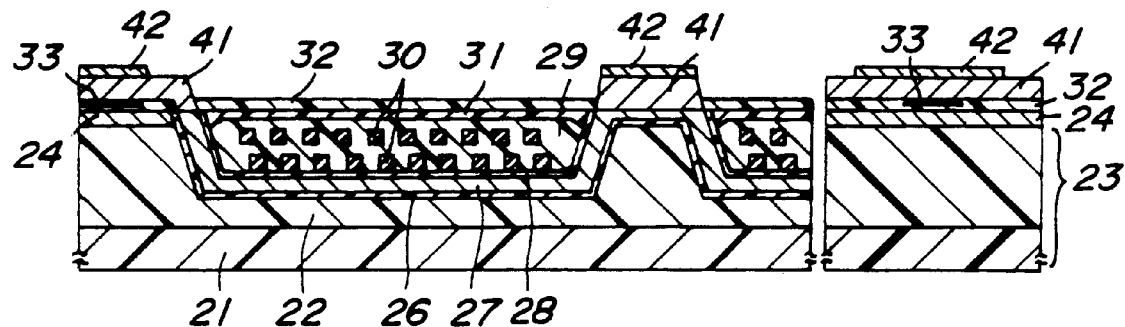
FIG_32
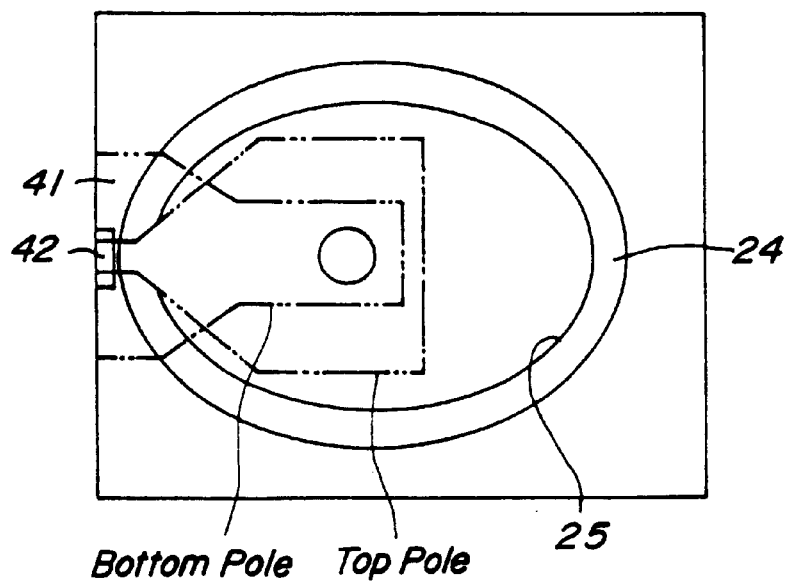

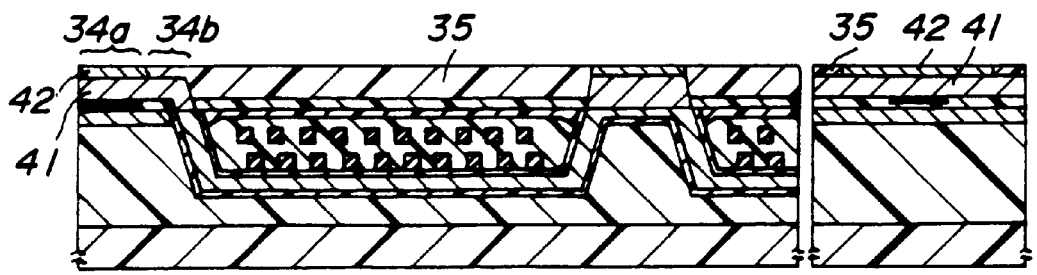
FIG_33A  FIG_33B
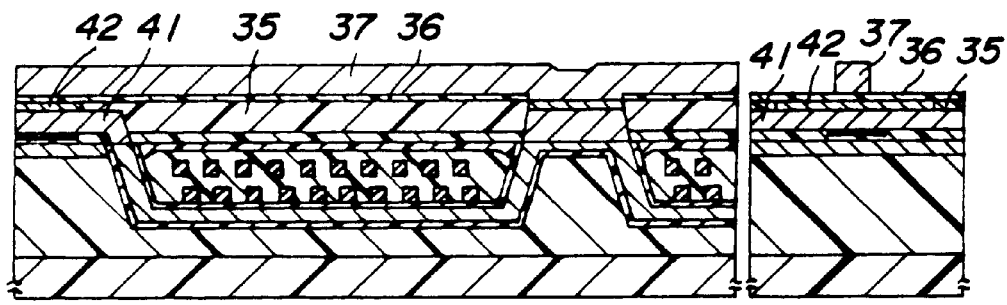
FIG_34A  FIG_34B
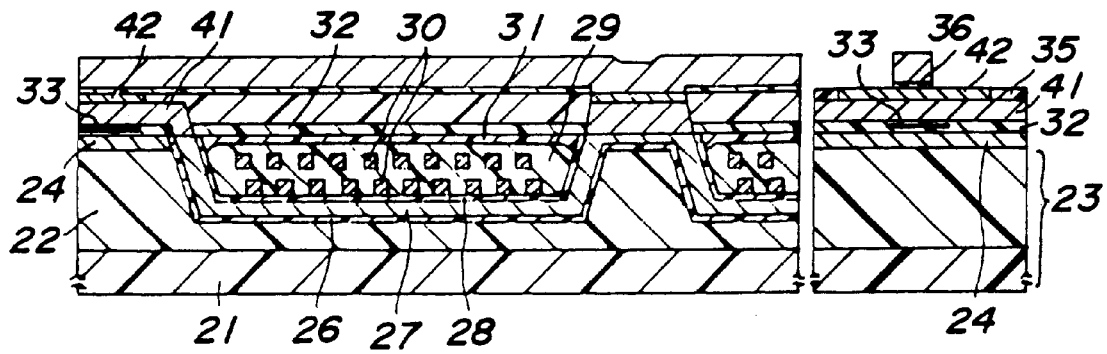
FIG_35A  FIG_35B

COMBINATION TYPE THIN FILM MAGNETIC HEAD HAVING A STEPPED MAGNETIC LAYER The present application is a Divisional of Ser. No. 09/277,845 filed Mar. 29, 1999, now U.S. Pat. No. 6,266,868. The entire disclosure of the prior application(s) is hereby incorporated by reference herein in its entirety.

BACKGROUND OF THE INVENTION

1. Field of the Invention

The present invention relates to a combination type thin film magnetic head having a writing inductive type thin film magnetic head and a reading thin film magnetic head including a magnetoresistive element, said heads being stacked on a substrate, and a manufacturing method thereof.

2. Explanation of the Related Art

Recently, a surface recording density of a hard disk drive has been improved, and the performance of a combination type thin film magnetic head has to be improved accordingly.

As a combination type thin film magnetic head, a head having an inductive type thin film magnetic head for writing and a magnetoresistive type thin film magnetic head for reading, which are stacked one on the other on a substrate, has been proposed and has been put to practical use. As a reading magnetoresistive element, in general, an element using a usual anisotropic magnetoresistive (AMR) effect, has been used so far, but an element using a giant magnetoresistive (GMR) effect, which has a larger resistance variation ratio than the AMR element by several times, has been developed.

In this specification, these AMR element and the GMR element or the like are referred to as a magnetoresistive type thin film magnetic head generically, or an MR element simply.

The surface recording density of several giga (G) bits per inch 2 can be realized by using the AMR element. Moreover, the surface recording density can be more improved by using the GMR element. In this way, the realization of a hard disk drive device in 10G byte or more becomes possible by raising the surface recording density.

One of factors for determining the performance of the reproducing head including such a magnetoresistive reproduction element is a height of the magnetoresistive reproduction element (MR height MRH). The MR height MRH is a distance of the magnetoresistive reproduction element whose edge is exposed to an air bearing surface measured from the air bearing surface. In the manufacturing process of the thin film magnetic head, desired MR height MRH is obtained by controlling an amount of polishing when the air bearing surface is polished.

On the other hand, in accordance with the improvement in the performance of the reproducing head, the performance of the recording head is required to be improved. It is necessary to raise the density of the truck on a magnetic recording medium in order to improve the surface recording density. For this purpose, it is necessary to make the width of a write gap on the air bearing surface narrow from several microns to the sub-micron order. The semiconductor processing technology is used to achieve this.

A throat height (TH) is one of the factors for deciding the performance of the writing thin film magnetic head. The throat height is a distance of a magnetic pole portion measured from the air bearing surface to an edge of an insulating layer by which a thin film coil is separated electrically, and it is desired to shorten this distance as much as possible. Reduction in size of the throat height TH is also decided by the polishing amount on the air bearing side.

Therefore, in order to improve the performance of the combination type thin film magnetic head including the stacked reading magnetoresistive type thin film magnetic head and writing inductive type thin film magnetic head, it is important to form the writing inductive type thin film magnetic head and the reading magnetoresistive type thin film magnetic head with well balancing.

FIGS. 1–9 show successive steps of manufacturing a conventional standard thin film magnetic head, in each figure, A is a cross sectional view of the entire thin film magnetic head, and B is a cross sectional view of the magnetic pole portion. Moreover, FIGS. 10–12 are a cross sectional of the entire conventional completed thin film magnetic head, a cross sectional view of the magnetic pole portion, and a plan view of the entire thin film magnetic head, respectively. In this embodiment, the thin film magnetic head is a combination type formed by stacking the readout inductive type thin film magnetic head and the reading MR reproduction element.

At first, as shown in the FIG. 1, an insulating layer 2 consisting of, for example, alumina ($Al_2O_3$) is deposited on a substrate 1 made of AlTiC in the thickness of about 5–10 $\mu$m. Next, as shown in the FIG. 2, a first magnetic layer 3 constituting one magnetic shield protecting a MR reproduction element of a reproducing head from the influence of the external magnetic field is formed with the thickness of 3 $\mu$m.

Then, as shown in the FIG. 3, after alumina is deposited by sputtering with the thickness of 100–150 nm, as an insulating layer 4, a magnetoresistive layer 5 made of a material having the magnetoresistive effect and constituting the MR reproduction element, is formed with the thickness of 10 nm or less, and then, is formed into a desired shape with a mask alignment of high accuracy.

Then, as shown in FIG. 4, again, an insulating layer 6 is formed, and the magnetoresistive layer 5 is embedded in the insulating layers 4 and 6.

Next, as shown in FIG. 5, a second magnetic layer 7 made of a permalloy is formed with the film thickness of 3 $\mu$m. The second the magnetic layer 7 not only has a function as the other shield for magnetically shielding the MR reproduction element together with the above mentioned first magnetic layer 3, but also has the function as the one pole of writing thin film magnetic head.

Next, after a write gap layer 8 made of a non-magnetic material, for example, alumina, is formed with thickness of about 200 nm on the second magnetic layer 7, and then a magnetic layer made of a magnetic material having a high saturation magnetic flux density, for example permalloy (Ni: 50 wt %, Fe: 50 wt %) and nitride iron (FeN) is formed, and is shaped into a desired form with the mask alignment of high accuracy, thereby obtaining a pole chip 9. The truck width is defined by a width W of the pole chip 9. Therefore, it is necessary to narrow the width W of the pole chip 9 in order to achieve a high surface recording density.

In this case, a dummy pattern 9' for connecting the second magnetic layer 7 with a third magnetic layer constituting the other pole, is formed at the same time. Then, after mechanical polishing or chemical mechanical polishing (CMP), a through-hole can be formed easily.

In order to prevent the effective write track width from being widened, that is, in order to prevent the magnetic flux from being widened at one pole during the data writing, the gap layer 8 in surroundings of pole chip 9 and the second magnetic layer 7 constituting the other pole are etched by the ion beam etching such as the ion milling. This state is shown in FIG. 5. This structure is called as a trim structure, and this portion becomes a magnetic pole portion of the second magnetic layer.

Next, as shown in FIG. 6, after forming an insulating layer 10 such as an alumina film having a thickness of about 3 $\mu$m, the surface is flattened by for example CMP.

Afterwards, after an electrically insulating photoresist layer 11 is formed to a predetermined pattern by the mask alignment with high accuracy, a first layer thin film coil 12 of, for example, copper is formed on the photoresist layer 11.

Then, as shown in FIG. 7, after forming an insulating photoresist layer by the mask alignment with high accuracy on the thin film coil 12, the surface is flattened by baking at the temperature of, for example, 250–300° C.

In addition, as shown in FIG. 8, a second layer thin film coil 14 is formed on the flattened surface of the photoresist layer 13. Next, after forming a photoresist layer on the thin film coil 12 by the mask alignment with high accuracy, the surface is flattened by baking at the temperature of, for example, 250° C.

As described above, the reason for forming the photoresist layers 11, 13, and 15 by the mask alignment with high accuracy is to define the throat height TH and the MR height MRH by using the edge of the photoresist layer on the side of magnetic pole portion as a standard position.

Next, as shown in FIG. 9, a third magnetic layer 16 constituting the other pole is selectively formed with the thickness of 3 $\mu$m on the pole chip 9 and photoresist layers 11, 13, and 15 by for example a permalloy according to the desired pattern.

The third magnetic layer 16 is contacted with the second magnetic layer 7 at a rear position away from the magnetic pole portion by means of the dummy pattern 9', so that the thin film coils 12 and 14 pass through a closed magnetic path constituted by the second magnetic layer 7, the pole chip 9, and the third magnetic layer 16.

In addition, an overcoat layer 17 consisting of alumina is deposited on the exposed surface of the third magnetic layer 16.

Finally, the side surface on which the magnetoresistive layer 5 and the gap layer 8 are formed is polished to form the air bearing surface (ABS) 18 which is to be opposed to the magnetic recording medium.

The magnetoresistive layer 5 is also ground during the formation of the air bearing side surface 18, and thus an MR reproduction element 19 is obtained. In this way, the above mentioned throat height TH and MR height MRH are decided. The state thereof is shown in FIG. 10. In actual thin film magnetic head, pads for making electric connections to the thin film coils 12, 14, and MR reproduction element 19 are formed, but they are not shown. Moreover, FIG. 11 is a cross sectional view in which the magnetic pole portion of the combination type thin film magnetic head formed thus was cut by a plane parallel to the air bearing surface 18.

As shown in FIG. 10, an apex angle θ between a segment S for connecting corner portions of side surfaces of the photoresist layers 11, 13, and 15 isolating the thin film coils 12 and 14 and the upper surface of the third magnetic layer 16, is also an important factor for determining the performance of the thin film magnetic head together with the above mentioned throat height TH and MR height.

Moreover, as shown in a plan view of FIG. 12, the width W of the pole chip 9 and the magnetic pole portion 20 of the third magnetic layer 16 becomes narrow and the width of the track recorded on the magnetic recording medium is decided by this width, so that it is necessary to narrow the width W as small as possible to achieve a high surface recording density. Moreover, in this FIG. 12, for the shake of simplify, the thin film coils 12 and 14 are shown by concentric circles.

Well, up to now, in the formation of the conventional thin film magnetic head, a particularly difficult problem after the formation of the thin film coils, is a miniaturization of the top pole formed along the coil projection, especially along its inclined portion (Apex) covered by the photoresist insulating layer.

That is, the given pattern is formed by depositing the photoresist with the thickness of 3–4 $\mu$m after a magnetic material such as permalloy is plated to form the third magnetic layer on the coil projection having the height of about 7–10 $\mu$m, and then the desired pattern is obtained by using the photolithography technology.

Here, if the thickness of 3 $\mu$m or more is necessary for as the resist film patterned by the photoresist on the recessed portion of the mountain like coil, the photoresist of the thickness of about 8–10 $\mu$m will be deposited at a root portion of the inclined portion.

On the other hand, in the third magnetic layer formed on the surface of the coil mountain portion which has such a height of about 10 $\mu$m and on the flat write gap layer, a narrow track of the recording head is formed in the edge neighborhood in the photoresist insulating layer (for example, 11 and 13 in FIG. 7), so that the third magnetic layer have to make the patterning with the width of about 1 $\mu$m. Therefore, the necessity for forming the pattern of width of 1 $\mu$m is caused by using the photoresist film of the thickness of 8–10 $\mu$m.

However, even if you form the narrow pattern with about 1 $\mu$m width with a thick photoresist film such as 8-10 $\mu$m, the crumble of the pattern etc. according to reflected light are generated during exposure due to photolithography and the decrease in the resolution happens due to the thick resist film, so that it is extremely difficult to pattern the narrow top pole used to form a narrow track, accurately.

Then, as shown in the above conventional embodiment, assuming that the data are written by the pole chip capable of forming the width of the narrow track recording head, it is proposed to improve the above problem by assuming the method for connecting the third magnetic layer to the pole chip after this pole chip is formed, in other words, by assuming structure divided into two, the pole chip deciding the width of the track and the third magnetic layer introducing the magnetic flux.

However, the following problems are still remained unsolved in the thin film magnetic head formed as described, especially in the recording head.

(1) The positional relationship of the pole chip 9 and magnetic layer 16 is decided by the alignment of photolithography, so that when viewing from the air bearing surface, there is a possibility that the central line of the pole chip and the central line of the third magnetic layer are shifted greatly, the leakage of magnetic flux might occur, and data might be written by the leakage flux from the third magnetic layer, an effective track width might be increased, and there is a problem of writing data on an adjacent track. It is necessary to widen the truck interval to avoid this problem, and thus the surface recording density will not be improved.

(2) The narrow pole chip 9 is brought into contact with the wide third magnetic layer 16 vertically and the magnetic flux is liable to be saturated at this portion, and therefore, the improvement of writing characteristic (Flux Rise Time) is not obtained satisfactory.

(3) The throat height TH and MR height MRH are decided based on the edge of the insulating layer isolating the thin film coil on the air bearing side, but this insulating layer is deformed easily by heat, because the insulating layer is usually formed by an organic photoresist insulating layer. Therefore, this insulating layer is deformed by heating treatment at about 250° C. during the formation of the thin film coil, and the pattern size of the insulating layer changes, so that the size of throat height TH and MR height might deviate from desired design values.

(4) It is necessary to shorten the throat height TH as much as possible to improve the magnetic property of the inductive type thin film magnetic head and to achieve the small size, but in the conventional combination type thin film magnetic head, a reference position of throat height zero is determined by the position of the edge of the magnetoresistive layer opposite to the air bearing surface, and can not be located at the side of the air bearing surface, therefore, there is a problem that the throat height TH cannot be shortened.

(5) In the reading thin film magnetic head consisting of the magnetoresistive element, it is advantageous to use the GMR element with high sensitivity as a magnetoresistive element, but there is a problem that the reading sensitivity of the GMR element is deteriorated by the heating treatment at about 250° C. performed for the photoresist film when the thin film coil of the inductive type thin film magnetic head is formed.

(6) The GMR element of high sensitivity has a structure formed by stacking different kinds of thin films of 1-5 nm thin. Therefore, a lot of manufacturing steps are required for forming the GMR element to complete the combination type thin film magnetic head, so that the electrostatic breakdown occurs during the handling, and thus there is a problem that the manufacturing yield is decreased.

(7) The alumina film having a thickness of 30–40 $\mu$m or more is formed as the overcoat layer at the end of the mass production process of the combination type thin film magnetic head for the protection of the device and the stabilization of the quality. Then, the warp might be generated in the substrate, and a lot of particles are generated by the spattering in case of forming the alumina film, so that there is a problem of deterioration in the device characteristic and the generation of defective components. Moreover, as described above, a long time of 15 hours or more is necessary to form a thick alumina film by spattering, therefore, the throughput might be extremely decreased. In addition, there is a problem in that a long time is required for the etching to expose the contact pads of the electrode pattern for the magnetoresistive element.

(8) In the combination type thin film magnetic head, the characteristics of the combination type thin film magnetic head are mainly determined by a width and MR height MRH of the magnetoresistive element of the magnetoresistive type thin film magnetic head, a width of the magnetic pole portion, a throat height TH, and characteristic of NLTS (Non-Linear Transition Shift) for the inductive type thin film magnetic head. Therefore, the requirement of user has concentrated on these specifications. For example, since the width of the magnetoresistive element is decided at an early step of the manufacturing process, when a particular width is specified by a user, a time period until the product is completed, that is, the cycle time becomes very long, and sometimes amounts to 30 to 40 days.

SUMMARY OF THE INVENTION

An object of the present invention is to solve or mitigate the various problems of the above conventional combination type thin film magnetic head and to provide a combination type thin film magnetic head which has a minute throat height TH and MR height MRH and has a given apex angle.

Another object of the present invention is to provide a method of manufacturing a combination type thin film magnetic head which has a minute throat height TH and MR height MRH and has a given apex angle, with high yield.

Other object of the present invention is to provide a method of manufacturing a combination type thin film magnetic head capable of reducing a thermal effect for the MR reproduction element, especially the GMR reproduction element.

A further object of the present invention is to provide a method of promptly manufacturing a combination type thin film magnetic head capable of manufacturing the combination type thin film magnetic head having specifications required by user.

According to the present invention, a combination type thin film magnetic head including a magnetoresistive type reading thin film magnetic head having a magnetoresistive element, and an inductive type writing thin film magnetic head in the stacking state, comprises:

a substrate having a recessed portion formed in one major surface;

a first magnetic layer extending along the major surface of the substrate from an end surface defining an air bearing surface to a position near an edge of the recessed portion;

a second magnetic layer extending along a part of an inner surface of the recessed portion such that the said second magnetic layer is magnetically isolated from the first magnetic layer;

a thin film coil at least a part of which is formed within said recessed portion such that the thin film coil is isolated by an insulating layer, said thin film coil constituting the inductive type thin film magnetic head;

a magnetoresistive element arranged in an electrically and magnetically isolated condition within a shield gap layer extending along a plane of the first magnetic layer opposite to the substrate;

a third magnetic layer having a thick portion formed to extend along a plane of said shield gap layer opposite to the substrate and is adjacent to the air bearing surface and a thin portion connected to an edge of the second magnetic layer on the side of the air bearing surface;

an insulating spacer layer formed to bury a step between the thick portion and the thin portion of the third magnetic layer;

a write gap layer extending along at least a plane of the thick portion of the third magnetic layer opposite to the substrate and being separated from the surface of the thin portion of the third magnetic layer opposite to the substrate via said insulating spacer layer; and a fourth magnetic layer extending along a plane of said write gap layer opposite to the substrate, being opposed to the third magnetic layer, and being magnetically coupled to the second magnetic layer at a rear position apart from the air bearing surface.

According to the present invention, a method of manufacturing a combination type thin film magnetic head having a magnetoresistive type reading thin film magnetic head including a magnetoresistive element, and an inductive type writing thin film magnetic head in the stacking state, comprises the steps of:

forming a recessed portion in a major surface of a substrate;

forming a first magnetic layer extending along the major surface of the substrate from an end surface constituting an air bearing surface to a position near an edge of the recessed portion;

forming a second magnetic layer extending along a part of an inner surface of the recessed portion such that the second magnetic layer is magnetically isolated from the first magnetic layer;

forming a thin film coil constituting the inductive type thin film magnetic head such that at least a part of the thin film coil is formed within the recessed portion to be isolated by an insulating layer;

forming a magnetoresistive element extending along a surface of the first magnetic layer such that the magnetoresistive element is electrically and magnetically isolated;

forming a third magnetic layer extending along a surface of the magnetoresistive element such that the third magnetic layer has a thick portion adjacent to the air bearing surface and a thin portion connected to an edge of the second magnetic layer on the side of the air bearing surface;

forming an insulating spacer layer such that a step between the thick portion and the thin portion of the third magnetic layer is buried and a surface of the insulating spacer layer becomes coplanar with a surface of the thick portion;

forming a flat write gap layer on the coplanar surfaces of the thick portion of the third magnetic layer and the insulating spacer layer;

forming a flat fourth magnetic layer extending along a surface of the write gap layer, being opposed to the thick portion of the third magnetic layer, and being magnetically coupled to the second magnetic layer at a rear position apart from the air bearing surface; and polishing the air bearing surface.

Moreover, according to the present invention, a method of manufacturing a combination type thin film magnetic head having a magnetoresistive type reading thin film magnetic head including a magnetoresistive element, and an inductive type writing thin film magnetic head in the stacked state, comprises the steps of:

manufacturing and stocking a plurality of common thin film magnetic head units common to combination type thin film magnetic heads having various characteristics, each of said units including a substrate having a recessed portion formed therein, a first magnetic layer extending along a surface of the substrate from an end face constituting an air bearing surface to a position near an edge of the recessed portion, a second magnetic layer extending along a part of an inner surface of the recessed portion such that the second magnetic layer is magnetically isolated from the first magnetic layer, and at least a part of the thin film coil constituting the inductive type thin film magnetic head, said part of the thin film coil being formed in the recessed portion to be isolated by an insulating layer;

wherein the following steps are performed for a common thin film magnetic head unit in accordance with characteristics of a thin film magnetic head to be manufactured;

forming a magnetoresistive element extending along a surface of the first magnetic layer such that the magnetoresistive element is electrically and magnetically isolated;

forming a third magnetic layer extending along a surface of the magnetoresistive element such that the third magnetic layer has a thick portion adjacent to the air bearing surface and a thin portion connected to an edge of the second magnetic layer on the side of the air bearing surface;

forming an insulating spacer layer such that a step between the thick portion and the thin portion of the third magnetic layer is buried by the spacer layer and a surface of the insulating spacer layer becomes coplanar with a surface of the thick portion;

forming a flat write gap layer on the coplanar surfaces of the thick portion of the third magnetic layer and the insulating spacer layer;

forming a flat fourth magnetic layer extending along a surface of the write gap layer, being opposed to the thick portion of the third magnetic layer, and being magnetically coupled to the second magnetic layer at a rear position apart from the air bearing surface; and polishing the air bearing surface.

In the above mentioned combination type thin film magnetic head according to the present invention, one of the yokes and one of the poles of the inductive type thin film magnetic head are divided into the second magnetic layer formed in the recessed portion and the third magnetic layer formed at the magnetic pole portion, and the third magnetic layer is constituted by the thick portion adjacent to the air bearing side and the thin portion connected with the edge of the second magnetic layer on the air bearing surface side, and thus the step between these two portions is buried with the insulating spacer layer. These points differ greatly from the conventional combination type thin film magnetic head. By adopting such a constitution, the reference position of throat height zero of the inductive type thin film magnetic head is determined by the step formed at the boundary between the different thickness portions constituting the third magnetic layer, and this position of the step can be set independently from the position of the edge of the magnetoresistive layer constituting the magnetoresistive element opposite to the air bearing side. For instance, it is possible to set the step position which is superposed with the magnetic resistance layer, and thus the throat height can be shortened compared with the conventional combination type thin film magnetic head. Moreover, the apex angle is determined by an inclination angle of a side wall of the recessed portion, and it is preferable to set said inclination angle of the side wall of the recessed portion to 45–75°, especially 55–65°.

In addition, in the combination type thin film magnetic head according to the present invention, the surface of the thick portion of the third magnetic layer opposite to the substrate is coplanar with the surface of the insulating spacer layer, and therefore the write gap layer as well as the fourth magnetic layer formed thereon can be made flat, and thus the magnetic head having desired size and shape can be easily manufactured. Furthermore, the overcoat layer formed on the fourth magnetic layer can be also flat, so that its thickness can be small and unwanted stress due to the overcoat layer can be reduced.

In addition, in the combination type thin film magnetic head according to the present invention, the third magnetic layer is preferably made of a material whose saturation magnetic flux density is higher than that of the second magnetic layer. As stated above, in the combination type thin film magnetic head according to the present invention, the bottom yoke and bottom pole are divided into two magnetic layers, i.e. the second and third magnetic layers. When the third magnetic layer constituting the magnetic pole is made of a material whose saturation flux density is higher than that of the second magnetic layer, the treatment during the manufacturing process becomes easy and the manufacturing cost can be lowered as compared with the case in which both the yoke and the entire pole is made of a material having a high saturation magnetic flux density.

In addition, according to the manufacturing method of the combination type thin film magnetic head of the present invention, after the thin film coil is formed within the recessed portion, the magnetoresistive element is formed. Therefore, the magnetoresistive element is not exposed to heating treatment for forming the thin film coil, the problem of deterioration in characteristics of the magnetoresistive element does not occur, and thus the reading GMR element with a high sensitivity, but is liable to be affected by heat can be advantageously used.

In the manufacturing method of the combination type thin film magnetic head according to the present invention, it is preferable that said step of forming the recessed portion and said step of forming the first magnetic layer include a step of forming, on the substrate, the first magnetic layer as a mask with an aperture corresponding to the recessed portion, and a step of forming the recessed portion in the surface of the substrate by performing etching while said first magnetic layer is used as a mask. In this case, it is preferable to conduct the formation of the first magnetic layer plating and to perform the formation of the recessed portion by reactive ion etching. Then, the deep recessed portion having a depth not less than 5 μm can be formed accurately.

In addition, in the method of manufacturing a thin film magnetic head, in which a plurality of common thin film magnetic head units commonly usable for manufacturing combination type thin film magnetic heads having various characteristics are previously manufactured and stocked, it is possible to be able to correspond to various demands of users promptly, and thus the cycle time until the product is completed can be remarkably shortened.

BRIEF DESCRIPTION OF DRAWINGS

FIGS. 1A–10 are cross sectional views showing successive steps of a method of manufacturing the conventional combination type thin film magnetic head;

FIGS. 11 and 12 are a cross sectional view and a plan view, respectively showing a magnetic pole portion in the step of FIG. 10;

FIGS. 13A–16B are cross sectional views showing successive steps in the first embodiment of the manufacturing method of combination type thin film magnetic head according to the present invention;

FIGS. 18A–26B are cross sectional views showing successive steps after the step shown FIG. 16;

FIG. 27 is a plan view showing the combination type thin film magnetic head of step shown in FIG. 26;

FIGS. 28A and 28B are cross sectional views showing the step following to the step shown in FIG. 26;

FIGS. 29A to 30B are cross sectional views showing a step on the way in the second embodiment of the manufacturing method of the combination type thin film magnetic head according to the present invention;

FIGS. 31A and 31B are cross sectional views showing a step on the way in the third embodiment of the manufacturing method of the combination type thin film magnetic head according to the present invention; and FIGS. 32–35B are cross sectional views showing the successive steps after the step shown in FIG. 31.

EXPLANATION OF PREFERRED EMBODIMENTS

Figure 17:
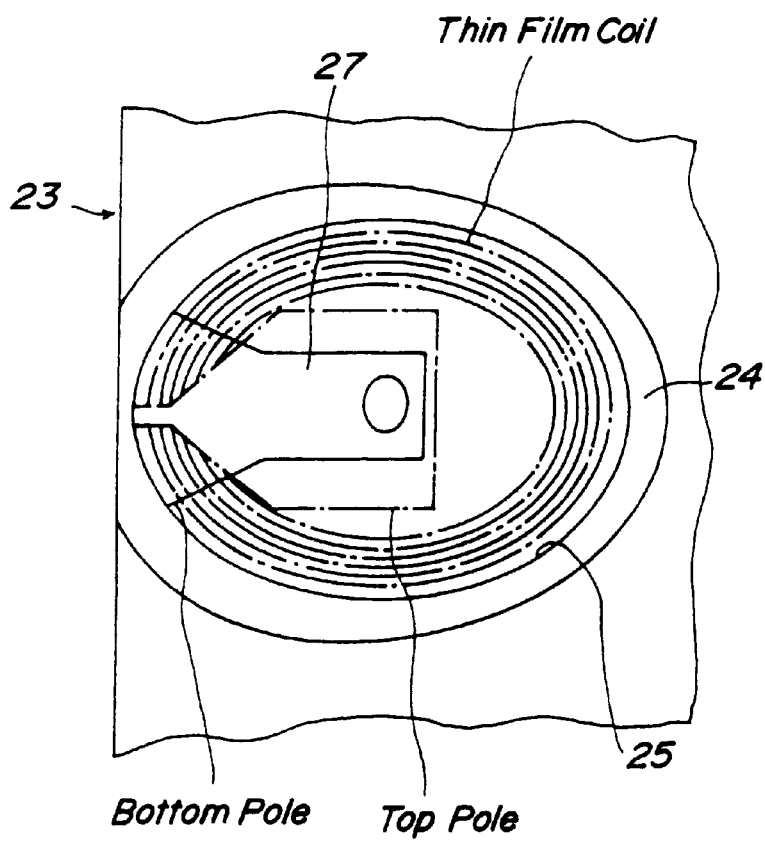
FIG. 17 is a plan view showing the combination type thin film magnetic head in the step shown in FIG. 15.

Hereafter, the first embodiment of the combination type thin film magnetic head according to the present invention and the manufacturing method thereof will be explained with reference to FIGS. 13–27. In these drawings, A designates a cross sectional view cut along a plane perpendicular to the air bearing surface, and B designates a cross sectional view cut along a plane parallel with the air bearing surface.

FIG. 13 shows a condition in which an insulating layer 22 consisting of alumina with the film thickness of about 10 μm, is formed on one major surface of a substrate main body 21 made of AlTiC. In this specification, these substrate main body 21 and insulating layer 22 are referred to as a substrate or an wafer 23. Moreover, in this specification, an insulating layer means a film which has at least an electrically insulating property, and it may or may not have a non-magnetic property. However, in general, an electrically insulating material such as alumina also has the non-magnetic property. Therefore, an insulating layer and a non-magnetic layer are used as the same meaning.

Next, a first magnetic layer 24 constituting one of shields for a magnetoresistive effect type thin film magnetic head is formed on the insulating layer 22 of the substrate 23 according to a given pattern including an aperture 24a at portion at which a recess is to be formed. FIG. 14 shows a state in which a recessed portion 25 is formed in the surface of the insulating layer 22 by reactive ion etching, while the first magnetic layer 24 is used as a mask. Moreover, as shown in FIG. 14, a portion 22a of the insulating layer 22 remains at the center of the recessed portion 25, in the shape of an island, and the second magnetic layer is formed on its top surface. Such a structure is necessary to connect it with one yoke when the other yoke is formed.

In this example, the above mentioned first magnetic layer 24 is made of a permalloy, and is formed by the plating method. Moreover, in the reactive ion etching, $BCl_3$, $Cl_2$, $CF_4$, $SF_6$ or the like may be used as an etching gas. According to such a reactive ion etching, a deep recessed portion 25 of 5 μm or more can be accurately formed in a relatively short time. In this embodiment, the depth of recessed portion 25 is assumed to be 7–8 μm.

In this embodiment, the apex angle of the inductive type thin film magnetic head is determined by an angle of a side wall of recessed portion 25, and this angle may be preferably set to 45–75°, especially 55–65°. In this embodiment, the angle is set to about 60°.

Next, in order to form one of the poles, a mask consisting of a photoresist film is formed on the surface of the first magnetic layer 24 in accordance with a given pattern, and then the first magnetic layer is selectively etched as shown in FIG. 15. The first magnetic layer 24 formed on the above mentioned island shaped insulating layer 22 is removed by this etching process.

In this embodiment, the first magnetic layer 24 which is used as a mask for forming the recessed portion 25 is formed to have a desired pattern and one of the shields is formed by the first magnetic layer. However, a mask may be formed by a metal or radical compound film, and after forming the recessed portion, the mask may be removed and then the first magnetic layer may be formed according to a given pattern.

Next, as shown in FIG. 16, an insulating layer 26 consisting of alumina, is formed on an inner surface of the recessed portion 25 as well as on the first magnetic layer 24 with the thickness of 0.3–0.5 μm. Then, a second magnetic layer 27 constituting the one of yokes is formed thereon with the thickness of about 4 μm according to a given pattern, and then, an insulating layer 28 made of alumina is formed thereon with the thickness of 0.5–1 μm.

A condition after forming the second magnetic layer 27 according to a given pattern is shown in FIG. 17. In FIG. 17, the insulating layer 28 formed on the second magnetic layer 27 is omitted. Moreover, a thin film coil and a top pole of the inductive type thin film magnetic head to be formed later are shown by a virtual line.

It should be noted that in the actual manufacturing process, after a plurality of combination type thin film magnetic heads have been formed on the wafer in matrix, the wafer is cut into plural bars, an end face of each bar is polished to form the air bearing surface, and finally, an individual combination type thin film magnetic head is obtained by cutting the bar. Therefore, in the state of FIG. 17, the end face of the head does not appear, but this end face is shown for the sake of explanation. Therefore, in FIGS. 13-16 and the drawing after that, a front view of this end face is shown in B.

Figure 18A:
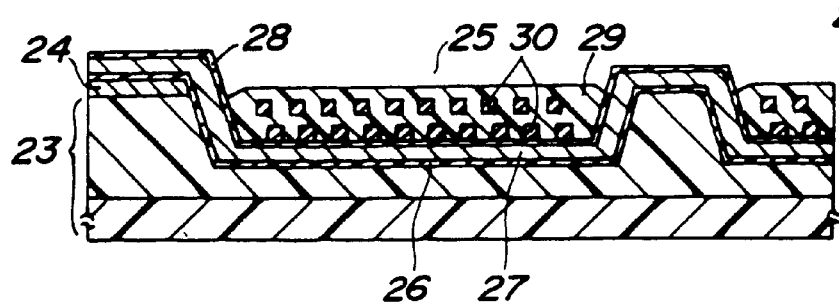
Figure 18B:
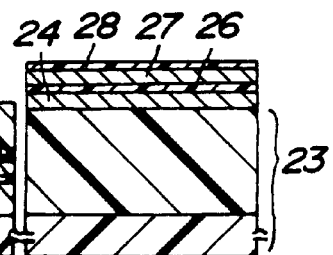

Next, as shown in FIG. 18, a two layer thin film coil 30 is formed to be isolated by an insulating layer 29 within the recessed portion 25 in which the insulating layer 26, second magnetic layer 27 and insulating layer 28 are formed internally. In case of forming the thin film coil 30, the annealing process of 200–250° C. is carried out to make the surface flat.

Next, as shown in FIG. 19, an insulating layer 31 made of alumina is formed on the entire surface with the thickness of 3–4 μm. The insulating layer 31 may be made of a silicone oxide instead of alumina.

Next, chemical-mechanical polishing (CMP) is performed to flatten the surface of the insulating layer 31 such that the first magnetic layer 24 and an end face of the second magnetic layer 27 are exposed and the surface of insulating layer 31 is made coplanar with the surface of the first magnetic layer. Furthermore, after forming parts of leads for connecting the magnetoresistive element to be formed later to the outside, a first shield gap layer 32a made of alumina is formed with the thickness of 0.1 μm. This state is shown in FIG. 20. By performing such a process, the thickness of about 4 μm of the first magnetic layer 24 is decreased to about 3 μm.

According to the present invention, a structure shown in FIG. 20, is referred to as a common unit for thin film magnetic head which can be commonly used for manufacturing combination type thin film magnetic heads having various characteristics. A number of such common units for combination type thin film magnetic head are manufactured and stocked previously. Then, a combination type thin film magnetic head having given characteristics required by a user can be manufactured using the common unit as a starting material. As a result, it is possible to satisfy various demands of users appropriately and desired combination type thin film magnetic heads can be offered promptly.

Next as shown in FIG. 21, a GMR layer 33 is formed on the first shield gap layer 32a provided on the first magnetic layer 24, after forming the remaining portions of the leads for connecting the GMR layer to the outside, a second shield gap layer 32b made of alumina is formed with the thickness of 0.1 μm.

Next, portions of the shield gap layer 32 formed on portions of the end face and island portion of the second magnetic layer 24 are selectively removed as shown in FIG. 21. Though this process may be effected by a lift-off process, in this embodiment, alumina of the shield gap layer 33 is selectively removed by the reactive ion etching, in which the photolithography technology is utilized and a BCl₃ based gas is employed.

Afterwards, as shown in FIG. 22, a third magnetic layer 34 is formed so as to be connected with the second magnetic layer 27 at the edge of the recessed portion. It should be noted that in the drawings after FIG. 22, for the sake of simplicity, the first and second shield gap layers 32a and 32b are shown as an integrated shield gap layer 32. In this embodiment, the third magnetic layer 34 is formed by depositing a permalloy with the thickness of about 3.5 μm by plating.

Next, in order to reduce partially a thickness of a portion of the third magnetic layer 34 connected with the second magnetic layer 27, a mask is formed on the remaining portion by the photolithography technique. Then, said connected portion of the third magnetic layer is subjected to the ion beam milling and is removed over a part of its thickness to form a thick portion 34a and a thin portion 34b. This state is shown in FIG. 23. Here, a height of a step formed at a boundary of these thick portion 34a and thin portion 34b, i.e. a difference d in thickness of these portions may be, for instance, 1 μm.

Next, an insulating layer 35 made of alumina is formed on the entire surface with the thickness of several micro-meters larger than the step difference d, and is polished by CMP to be flat such that a surface of the thick portion 34a of the third magnetic layer 34 is exposed. This state is shown in FIG. 24. Also in this case, the thick portion 34a of the third magnetic layer is over-etched such that a thickness of the thick portion becomes about 3 μm and the above step difference d becomes 0.5 μm. The above third magnetic layer 34 is formed also on the island portion at the center of recessed portion, its thickness is the same as that of the above portion 34a.

In this specification, since the insulating layer 34 is formed to bury the step between thick portion 34a and thin portion 34b of the third magnetic layer 34, this insulating layer 34 is referred to as insulating spacer layer.

Next, a write gap layer 36 made of alumina and having a thickness of 150–200 nm is formed on the entire surface which is flattened by the above mentioned CMP process. The write gap layer on the island portion is selectively removed to expose the underlying third magnetic layer 34.

Then, a fourth magnetic layer 37 including a top pole is formed with the thickness of about 3 μm according to a given pattern. This state is shown in FIG. 25. As shown in FIG. 27, a width of the magnetic pole portion of the fourth magnetic layer 37 is narrow. Moreover, the fourth magnetic layer 37 comes in contact with third magnetic layer 34 formed on the above island portion, and the third magnetic layers are connected with the second magnetic layer, so that the magnetic circuit enclosing a part of the thin film coil 30 is constituted.

Next, as shown in FIGS. 26 and 27, the reactive ion etching is performed using the magnetic pole portion of the fourth magnetic layer 37 as a mask, thereby removing a portion of the write gap layer 36 surrounding the pole portion, and then the ion beam etching is conducted to remove the thick portion 34a of the third magnetic layer 34 over a part of its thickness. In this way, the write gap layer 36 can be removed by the reactive ion etching in a short time. Therefore, a reduction of a thickness of the fourth magnetic layer 37 during this etching can be remained small.

Furthermore, the surface of thick portion 34a of the third magnetic layer 34 is partially etched by the ion beam etching, in this embodiment, ion milling, to form the trim structure, while the magnetic pole portion of the fourth magnetic layer 37 and the write gap layer 36 as mask, so that the trim structure and the top pole formed by the fourth magnetic layer are always aligned accurately, and thus the leakage of magnetic flux can be effectively suppressed.

Moreover, the third magnetic layer 34 is removed by the ion beam etching, and thus a side wall of the trim structure can have a desired configuration by appropriately selecting the etching angle.

After alumina is deposited on the entire surface with the thickness of 3–5 μm as a protection overcoat layer 39, etching is performed for exposing contact pads connected to the thin film coil 30 of the inductive type thin film magnetic head as well as contact pads connected to the GMR layer 33 of the magnetoresistive type thin film magnetic head. In this embodiment, the overcoat layer 39 may have a small thickness as described above, because the fourth magnetic layer 37 is flat, and thus the etching process for exposing the above contact pattern can easily be effected in a short time by ion milling or reactive ion etching. However, in the conventional combination type thin film magnetic head, there is a problem that a thick overcoat layer is necessary, so that a long time is required for the etching to expose the contact pads.

As described above, after each component of the combination type thin film magnetic head is formed on the wafer 23, the wafer is cut into bars, and an end face of a bar including a plurality of combination type thin film magnetic heads is polished to form the air bearing surfaces. Then, the bar is cut into individual combination type thin film magnetic heads. This step is similar to the conventional method, and any further detailed explanation is dispensed with.

In this embodiment, when the air bearing surface is polished, the step between the thick portion 34a and the thin portion 34b of the third magnetic layer 34 is used as a standard position of throat height zero. Since this position is not changed during the manufacturing process, the throat height and MR height can be formed accurately to have desired values. In addition, the apex angle is decided by the inclination angle of the side wall of recessed portion 25, this inclination angle can be accurately formed to have a desired angle in case of forming the recessed portion and this angle is not changed during the manufacturing process, so that the inductive type thin film magnetic head having the desired accurate apex angle can be obtained. By such an effect, in the combination type thin film magnetic head according to the present invention, a miniaturization can be realized sufficiently without deteriorating characteristics.

In addition, according to the manufacturing method of the present invention, after the formation of the thin film coil 30 which requires the heating treatment of about 250° C., the GMR layer 33 is formed, and therefore the characteristics of the GMR layer are not affected by the heating treatment. This is particularly advantageous in case of using GMR layer which has a high sensitivity, but is liable to be damaged by heat.

In the combination type thin film magnetic head according to the present invention, the position of step of the boundary between the thick portion 34a and the thin portion 34b of the third magnetic layer 34 which constitutes the reference position of throat height zero can be set in regardless of the position of the edge of the GMR layer 33 opposite to the air bearing surface, and thus said reference position can set closer to the air bearing surface, and therefore the throat height can be shortened and the magnetic property of the inductive type thin film magnetic head can be improved.

Figures 29A, 29B:
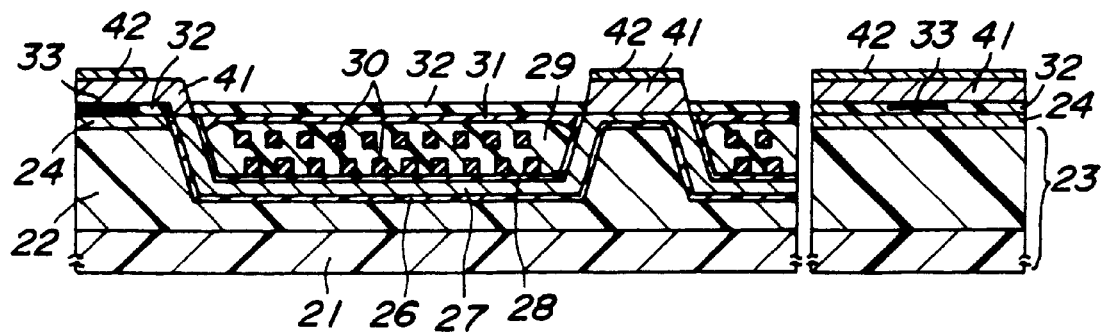
Figures 30A, 30B:
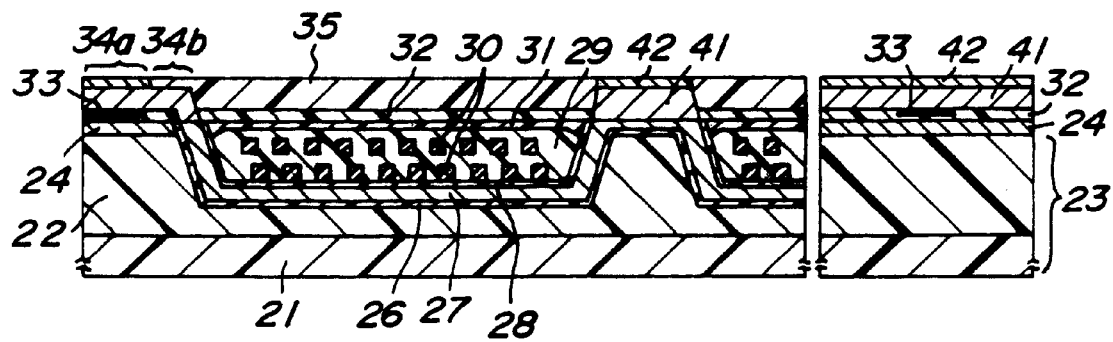

FIGS. 29 and 30 show a second embodiment of the combination type thin film magnetic head and the manufacturing method according to the present invention. In this embodiment, the same reference numerals are used throughout the drawings to indicate the same or similar parts as in the first embodiment.

In this embodiment, steps up to FIG. 29 are the same as steps up to FIGS. 13–21 of the first embodiment. In the first embodiment, the thick portion 34a and thin portion 34b of the third magnetic layer 34 are formed by etching. In the present embodiment, as shown in FIG. 29, after a lower magnetic layer 41 having a thickness equal to that of the thick portion, for example 2 μm, is formed with a permalloy, an upper magnetic layer 42 made of an iron nitride (FeN) is selectively formed with the thickness of 1 μm by the electric plating. Instead of the iron nitride, any magnetic material having a high saturation magnetic flux density such as Fe—Co—Zr amorphous may be used.

Next, as shown in FIG. 30, an insulating spacer layer 35 is formed over the whole surface and is then subjected to the CMP process to obtain a flat surface such that a thick portion 34a and a thin portion 34b of the third magnetic layer are formed and a step formed between these portions is buried with the insulating spacer layer. The subsequent steps are similar to the above first embodiment, so that the explanation thereof is omitted.

In this embodiment, the upper magnetic layer 42 forming the thick portion 34a of the third magnetic layer is made of a magnetic material having a high saturation magnetic flux density such as nitride iron and Fe—Co—Zr amorphous. In general, such a material is liable to be easily oxidized and is difficult to be handled, so that the present embodiment has a merit in using this material only to an upper magnetic layer.

FIGS. 31–35 show a third embodiment of the combination type thin film magnetic head and the manufacturing method thereof according to the present invention. Steps up to FIG. 31 in this embodiment are similar to steps up to FIGS. 13–21 of the first embodiment. In this embodiment, as well as the second embodiment, after a lower magnetic layer 41 having a thickness equal to a thickness of thin portion, for example, 2 μm is formed with a permalloy, an upper magnetic layer 42 made of an iron nitride (FeN) is selectively formed with the thickness of 1 μm by the electric plating, but as shown in FIG. 31B, a width of the upper magnetic layer 42 is made larger a little than a width of the GMR layer 33. The shape of the upper magnetic layer 42 is shown in FIG. 32. In FIG. 32, the upper magnetic layer 42 is shown with hatching.

Next, as shown in FIG. 33, an insulating spacer layer 35 is formed and its surface is flattened by the CMP. As shown in FIG. 33B, both sides of the upper magnetic layer 42 are enclosed by the insulating spacer layer 35.

Continuously, as shown in FIG. 34, after forming a write gap layer 36 on the flat surface, a part of the gap layer is removed, thereby forming a fourth magnetic layer 37 according to the desired pattern.

Next, as shown in FIG. 35, the write gap layer 36 surrounding the magnetic pole portion is removed by the reactive ion etching, while the magnetic pole portion of the fourth magnetic layer 37 is used as a mask. In the embodiment mentioned above, thereafter the etching is given performed further such that the upper magnetic layer 42 is removed to form the trim structure. But in this embodiment, since the upper magnetic layer 42 is formed to have a narrow wide, such etching process need not be effected. Therefore, the process of this embodiment becomes simpler. Steps thereafter are similar to the above embodiment, the explanation thereof is omitted.

The present invention is not limited only to the above described embodiments, but many alternations and modifications are possible. For example, materials, film thickness, fabricating processes and etching processes for various members are not limited to those of the above explained embodiments, but may be selected at will within an evident range conceived by those skilled in the art.

According to the combination type thin film magnetic head and the manufacturing method of the present invention, the performance and the yield can be improved. The reason thereof is that since the magnetic material with high saturation magnetic flux density can be used as the third magnetic layer constituting the magnetic pole portion, the magnetic flux generated by the thin film coil reaches effectively the writing region without causing the saturation on the way and a loss of the magnetic flux decreases. Other advantages according to the present invention may be summarized as follows.

Although the combination type thin film magnetic head has the normal structure in which the inductive type thin film magnetic head is formed on the magnetoresistive type thin film magnetic head, since the MR or GMR layer of the magnetoresistive effect type thin film magnetic head can be formed after forming the complete thin film coil or more than a half of the thin film coil, the characteristics of the MR or GMR layer are not deteriorated by the heating treatment and the moisture absorption or the like. Since the GMR layer is liable to be damaged by the heat, the above merit is advantageous. In relation to this, the number of the process steps after the formation of the MR or GMR layer is small, and therefore the possibility that the electrostatic breakdown might occur during the handling or the like, becomes small remarkably.

Moreover, since the reference position of throat height zero is defined by a the step formed between the thick portion and the thin portion of the third magnetic layer, this reference position is not changed during the manufacturing process. Furthermore, it is possible to set the position in regardless of the position of the edge of the magnetoresistive layer remote from the air bearing surface, and thus it is possible to bring the position closer to air bearing surface further. Therefore, the throat height can be shortened, and thus the magnetic property can be improved.

Moreover, the apex angle is determined by the side wall of the recessed portion and the inclination angle of the side wall does not change during the manufacturing process, so that the desired apex angle can be obtained and the magnetic property can be improved.

In addition, since the surface of the thick portion of the third magnetic layer and the surface of the insulating spacer layer can be made coplanar with each other, the write gap layer and fourth magnetic layer formed thereon can be made flat and the minute magnetic pole portion can be formed accurately, and a width of the track can be made narrow. In addition, the overcoat layer formed on the flat surface can be made thin, and thus undesired stress is not added to the substrate. Moreover, an opening for exposing the contact pads connected to the MR layer and thin film coil through the electrode pattern can be formed by the dry etching such as the reactive ion etching and ion beam etching, therefore, the process time can be shortened.

In addition, the common unit in which one of the shields, a part of one of the poles and the thin film coil have been formed on the substrate is manufactured and stocked, combination type thin film magnetic heads having various specifications corresponding to individual demands of users can be promptly manufactured, so that days from the order to the shipment can be shortened, shorter than a half of the known time period.

In Japanese Patent Laid open No. 7-192,222, there is disclosed a thin film magnetic head, in which in order to shorten the throat height, a thickness of a portion of a write gap layer adjacent to the air bearing surface is different from a thick of an inner portion. However, since a top pole has a ruggedness, the miniaturization of the pole portion is difficult. On the other hand, in the present invention, since the write gap layer is flat, the top pole can also be made flat and the miniaturization thereof is possible.

What is claimed is:

1. A combination type thin film magnetic head including a magnetoresistive type reading thin film magnetic head having a magnetoresistive element, and an inductive type writing thin film magnetic head in the stacked state, comprising:

a substrate having a recessed portion formed in one major surface;

a first magnetic layer extending along the major surface of the substrate from an end surface defining an air bearing surface to a position near an edge of the recessed portion;

a second magnetic layer extending along a part of an inner surface of the recessed portion such that the said second magnetic layer is magnetically isolated from the first magnetic layer;

a thin film coil at least a part of which is formed within said recessed portion such that the thin film coil is isolated by an insulating layer, said thin film coil constituting the inductive type thin film magnetic head;

a magnetoresistive element arranged in an electrically and magnetically isolated condition within a shield gap layer extending along a plane of the first magnetic layer opposite to the substrate;

a third magnetic layer having a thick portion and a thin portion, the thick portion formed to extend along a plane of said shield gap layer opposite to the substrate and to be adjacent to the air bearing surface, the thin portion being connected to an edge of the second magnetic layer on the side of the air bearing surface;

an insulating spacer layer formed to bury a step formed between the thick portion and the thin portion of the third magnetic layer;

a write gap layer extending along at least a plane of the thick portion of the third magnetic layer opposite to the substrate and being separated from the surface of the thin portion of the third magnetic layer opposite to the substrate via said insulating spacer layer; and a fourth magnetic layer extending along a plane of said write gap layer opposite to the substrate, being opposed to the third magnetic layer, and being magnetically coupled to the second magnetic layer at a rear position apart from the air bearing surface.

2. A combination type thin film magnetic head as claimed in claim 1, wherein said thin film coil is wholly formed within said recessed portion.

3. A combination type thin film magnetic head as claimed in claim 2, wherein said the surface of said thick portion of the third magnetic layer is coplanar with a surface of said insulating spacer layer opposite to the substrate, and said write gap layer and fourth magnetic layer are formed to be flat.

4. A combination type thin film magnetic head as claimed in claim 3, wherein said inductive type thin film magnetic head has a throat height which is formed with reference to a reference position defined by the step formed between the thick portion and the thin portion of the third magnetic layer.

5. A combination type thin film magnetic head as claimed in claim 1, wherein said first magnetic layer constitutes one of shields of the magnetoresistive type thin film magnetic head and said thick portion of the third magnetic layer constitutes the other shield.

6. A combination type thin film magnetic head as claimed in claim 1, wherein said second and third magnetic layers constitute one of yokes of the inductive type thin film magnetic head and said fourth magnetic layer constitutes the other yoke.

7. A combination type thin film magnetic head as claimed in claim 1, wherein said first magnetic layer constitutes one of shields of the magnetoresistive effect type thin film magnetic head, said thick portion of the third magnetic layer constitutes the other shield, said second and third magnetic layers constitute one of yokes of the inductive type thin film magnetic head, and said fourth magnetic layer constitutes the other yoke.

8. A combination type thin film magnetic head as claimed in claim 1, wherein an island region is formed substantially at a center of the recessed portion, the second magnetic layer is formed to cover the island region, and the second magnetic layer and the third magnetic layer are connected with each other at the island region.

9. A combination type thin film magnetic head as claimed in claim 1, wherein a trim structure is formed in said thick portion of the third magnetic layer.

10. A combination type thin film magnetic head as claimed in claim 1, wherein said magnetoresistive element is constituted by a giant magnetoresistive element.

11. A combination type thin film magnetic head as claimed in claim 1, wherein said third magnetic layer is made of a material whose saturation magnetic flux density is higher than that of the second magnetic layer.

* * * * *